United States Patent [15] 3,635,688
Kurokawa [45] Jan. 18, 1972

[54] GLASS BULB BLOW-MOLDING APPARATUS

[72] Inventor: Takaaki Kurokawa, Kanagawa-ken, Japan
[73] Assignee: Tokyo Shibaura Denki Kabushiki Kaisha also known as Tokyo Shibaura Electric Co., Ltd., Kanagawa-ken, Japan
[22] Filed: Aug. 13, 1969
[21] Appl. No.: 849,729

[30] Foreign Application Priority Data
Aug. 19, 1968 Japan...................................43/58537

[52] U.S. Cl....................................65/183, 65/185, 65/227, 65/263
[51] Int. Cl. .........................................................C03b 9/12
[58] Field of Search....................65/183, 184, 185, 186, 227, 65/263

[56] References Cited

UNITED STATES PATENTS 1,988,297 1/1935 Brown et al..........................65/263 X
3,338,698 8/1967 Morris...................................65/227 X Primary Examiner—Arthur G. Kellogg
Attorney—Robert E. Burns and Emmanuel J. Lobato

[57] ABSTRACT

A vacuum tank is provided in a glass bulb blow-molding machine of the ribbon-type to rapidly impart a negative pressure to the interior of each parison which is initially formed by blowing without a mold, thereby contracting the neck portion of the parison so that same may be clasped by a pair of mold halves without clipping the surface of the parison by the edges of the mold halves thereby preventing deformations and/or formation of casting fins in the final product.

1 Claims, 12 Drawing Figures

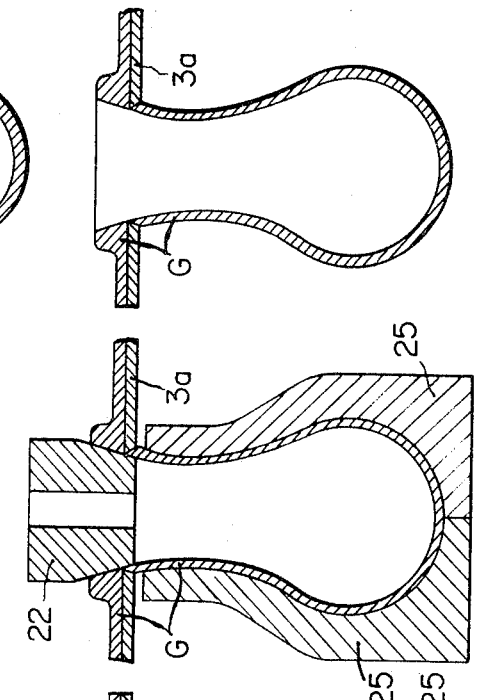
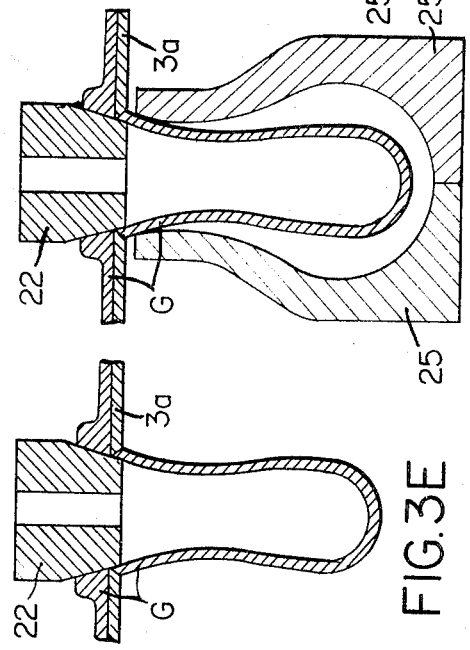
FIG.3A  FIG.3B  FIG.3C  FIG.3D
FIG.3E  FIG.3F  FIG.3G  FIG.3H

GLASS BULB BLOW-MOLDING APPARATUS

Background of the Invention

This invention relates generally to a glass bulb blow-molding apparatus of the so-called ribbon-machine-type for manufacturing electric lamp bulbs or glass bulbs, and more particularly to certain improvements therein.

The glass bulb-forming process in heretofore known glass bulb blow-molding apparatuses comprises the consecutive steps of puffing, temporarily stopping the puffing (atmospheric pressure), blow-molding (forming), and natural cooling.

By this process, however, it has been difficult to blow-mold glass bulbs having narrow throat sections, as described hereinafter, directly from semimolten glass in a ribbon form which is carried on orifice plates of a plate-link device, and such is an essential part of a ribbon machine. That is, referring to FIGS. 3 and 4, when a parison naturally suspensed from the orifice in an orifice plate is being formed into an electric lamp bulb, for example, the parison bulges downward directly into a substantially spherical shape from the edge of the orifice of the orifice plate in the puffing step as indicated in FIG. 3D. For this reason, it is very difficult to form the parison into a bulb having a throat or neck section wherein the diameters, as indicated in FIG. 4, have the relationship $D_1 > D_2$.

The reason for this is that when the parison suspended in a spherical form is clasped between a pair of mold-halves of a mold link, the diameter of the upper open part of the mold forming the throat or neck section of the bulb is less than the diameter of the base or root part of suspension of the parison, whereby the edge of the mold opening bites into the base or root part of the parison. As a result, there is the possibility of the occurrence of deformation and/or casting fins or flash at the neck part of the parison. This possibility has been a serious drawback in glass bulb blow-molding apparatuses known heretofore and impart a detrimental effect on the product quality.

SUMMARY OF THE INVENTION

It is an object of the present invention to provide an apparatus for blow-molding glass bulbs having narrow neck sections wherein means are provided to form the parison beforehand into a configuration substantially resembling that of the mold interior prior to closing of the mold thereby to overcome the above-described difficulty.

It is another object of the invention to provide an apparatus of the above-stated character in which the means for forming the parison is of simple construction and operation.

According to the present invention, there is provided, in a blow-molding apparatus of the character referred to above, a vacuum tank disposed between first and second compressed air reservoirs whereby each glass bulb is blow-molded by a process which comprises forming a parison by blowing or puffing of the glass ribbon on an orifice plate by means of one air reservoir, stopping the supply of air into the parison at a time immediately prior to closing of a mold consisting of split mold halves, imparting a negative pressure (below atmospheric pressure) to the parison interior in a rapid manner by means of the vacuum tank to thereby cause the neck portion corresponding to the suspension root part of the parison to contract beforehand to a size narrower than the opening of the mold, closing the mold around the parison, and then blow-molding the parison into a glass bulb structure in the mold by means of the other air reservoir.

The nature, principle, details, and utility of the invention will be more clearly apparent from the following detailed description with respect to a preferred embodiment of the invention when read in conjunction with the accompanying drawings, in which like parts are designated by like reference numerals.

BRIEF DESCRIPTION OF THE DRAWINGS

In the drawings:

FIGS 3A through 3H, inclusive, are elevational views indicating progressive operational states in the forming of the semimolten glass ribbon through the parison state and into a glass bulb in accordance with the invention;

DETAILED DESCRIPTION

Figure 1:
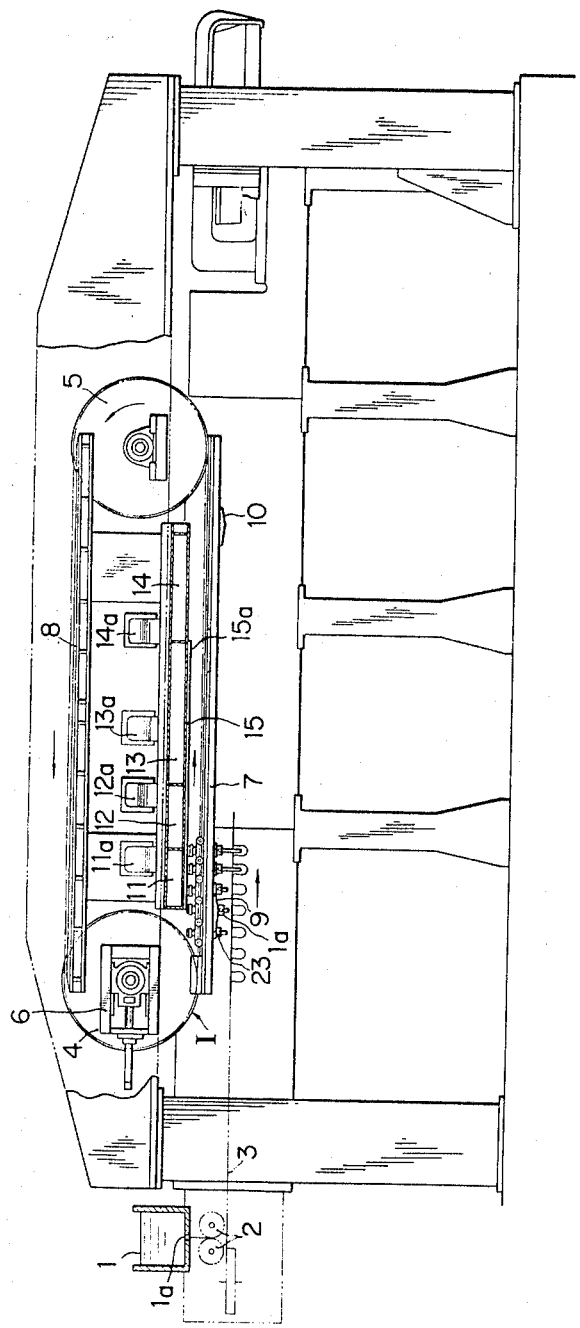
FIG. 1 is a diagrammatic side elevation, with parts cut away, showing one example of a glass bulb blow-molding apparatus according to the invention.

Referring first to FIG. 1, a glass starting material is melted in a melting furnace 1 provided at its bottom with an orifice 1a, and the resulting molten glass is discharged from the orifice 1a and is press-formed into a glass ribbon between and by a pair of transverse feed rolls 2 having a gap therebetween and positioned below the orifice 1a. The rolls are rotatably supported and are rotationally driven by drive means (not shown).

Figure 2:
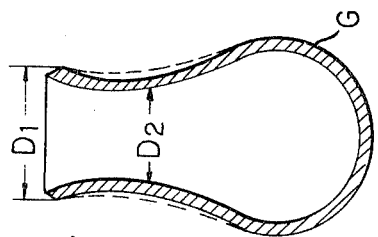
FIG. 2 is a diagrammatic elevational view, indicating the operational state of the ribbon-forming section of the blow-molding apparatus wherein semimolten glass discharged from an orifice of a glass-melting furnace is pressed and formed into a ribbon shape by a pair of feed rolls.
Figure 4:
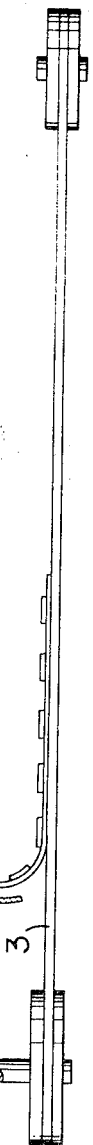
FIG. 4 is an elevation, in vertical section, showing a blow-molded glass bulb.

One of the feed rolls 2 is provided with a surface configuration such as to form disklike raised projections on the upper side of the ribbon at equally spaced intervals along the ribbon, as shown in FIG. 2. The ribbon thus formed is then carried on a plate-link device 3 installed horizontally and is thereby conveyed toward a synchronously operating blowhead device 1 and a mold-opening-and-closing link device (not shown) of a known type.

As shown in FIG. 1, the blowhead device I is passed around a pair of sprocket wheels 4 and 5, the shaft of the sprocket wheel 4 being rotatably supported by an adjustably movable bearing 6 for selectively adjusting the tension of the links of the blowhead device I. The blowhead device I comprises a large number of blowheads 1a coupled in a chain formation as shown in FIG. 1. The blowheads 1a in this linked formation rotate in the form of a loop, guided by upper and lower tracks 8 and 7 installed integrally with the machine frame. On the lower surface of the lower track 7 near the two ends thereof are provided cam members 9 and 10 adapted to cause specific operations of the blowheads 1a and are formed substantially integrally on the lower surface of the lower track 7.

Above the blowheads 1a as they advance horizontally under the guidance of the track 7, a puffing air-storage vessel 11, a vacuum tank 12, a blowing air-storage vessel 13, and a cooling air-storage vessel 14 are disposed in a row in the sequence named from left to right as viewed in FIG. 1 and confront the track 7. These storage vessels are provided with supply inlets 11a, 13a, and 14a for supplying compressed air, while the vacuum tank 12 is provided with suction outlet 12a for evacuating air from within each parison to create negative pressure therewithin.

Furthermore, a large number of small holes are formed in a row in the bottom plate 15 of the storage vessels 11, 13, and 14 and the vacuum tank 12. The row of holes is positioned above and in alignment with the path along which the blowheads 1a of the blowhead device are conveyed.

Figure 5:
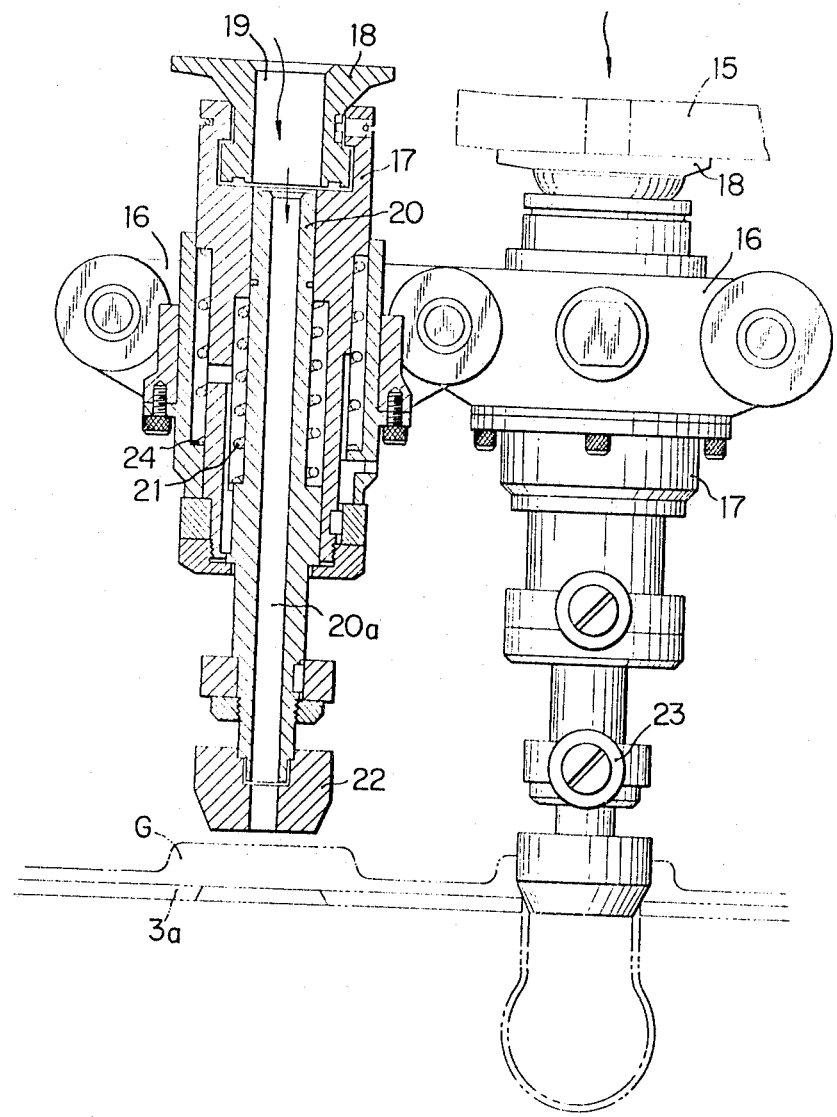
FIG. 5 is an elevation, partly in vertical section, showing the exterior and internal construction of a blowhead incorporated in the apparatus of the invention.

One example of a blowhead 1a suitable for use according to the invention is illustrated in FIG. 5. When each blowhead 1a is conveyed and arrives at a position below the above-mentioned bottom plate 15, it moves along its path and a sliding contact member 18, which is substantially integral with a vertical tubular stem 17 loosely fitted within the blowhead body 16, abuts against the lower surface of the bottom plate 15 whereupon compressed air within the puffing air storage vessel 11 passes through a passage hole in the bottom plate 15 and flows into a passage hole 19 provided in the sliding contact member 18.

On the other hand, a blowing nozzle 22 attached to the end of a hollow rod 20, which is disposed coaxially below the member 18, is forced by the elastic force of a compression coil spring 21 so as to be pressed and fitted into an orifice in an orifice plate 3a through the ribbon-shaped semimolten glass as indicated in FIG. 3C. At the same time, the compressed air passes through the hollow interior 20a of the hollow rod 20 and is injected into the interior of the resulting parison.

The apparatus according to the invention operates in the following manner.

Glass material in a uniformly molten state which has been discharged from orifice 1a of glass-melting furnace 1 is pressed into a ribbon, as described hereinbefore, by feed rolls 2 and sent thereby to plate-link device 3, being placed as a glass ribbon G on orifice plates 3a thereof. The ribbon G is thus conveyed to the blowhead device I and the mold-opening-and-closing device (not shown) is actuated to converge and travel synchronously therewith (refer to FIG. 2).

Thus, blowheads Ia of blowhead device I pass around the pair of sprockets 4 and 5 and are successively brought into positions confronting the glass ribbon and are guided by the track 7 along a horizontal path of travel and travel in the arrows shown in FIG. 1. As each blowhead Ia thus travels, a guide roller 23 thereof contacts the inclined surface of the aforementioned cam member 9 of the track 7 whereupon the tubular stem 17 of the blowhead is pushed downward counter to the spring force of the spring 24 as indicated in FIG. 5. Accordingly, the upper surface of contact member 18, which is integrally mounted on the stem 17, moves into a path below the bottom plate 15 of the storage vessel 11 without contacting the end part of this vessel.

Then, when the guide roller 23 moves past and beyond the inclined surface of cam member 9, the contact member 18 is returned by the spring force of spring 24 and abuts the bottom plate 15 of the storage vessel 11. Accordingly, compressed air flows out from the storage vessel 11 and enters, through the hole in the bottom plate 15, into a hole 19 formed in the contact member 18 of blowhead Ia, as indicated in FIG. 5. In this state, since as described hereinbefore, the hollow rod 20 is in the lower position due to the spring force of the spring 21, the hollow rod is fitted through the molten glass ribbon G, with the aperture provided in the orifice plate 3a as indicated in FIG. 3C. On the other hand, the compressed air supplied through the hole 19 of the contact member 18 further passes through the hollow interior 20a of the hollow rod 20 and blows the molten glass into a bulbous parison as indicated in FIG. 3D.

Furthermore, since the blowhead Ia travels in synchronism with the orifice plate 3a, the compressed air is continuously supplied for a specific period to the molten glass. Then, when the contact member 18 of the blowhead Ia moves away from the storage vessel 11 to the bottom plate 15 of the vacuum tank 12, air within the parison is evacuated because of the negative pressure condition of the vacuum tank 12.

A notable feature of the present invention is that the pressure of the air within the parison is thus temporarily reduced to a negative value (below atmospheric pressure) in a rapid manner to thereby cause the neck portion, corresponding to the suspension base or root part of the parison, to be contracted beforehand to a size smaller than the opening rim of the mould as indicated in FIG. 3E.

Next, as the blowhead Ia continues to travel and arrives at a position below the bottom plate of the succeeding storage vessel 13, mold halves 25 of the mold-link-opening-and-closing device clamp the parison, as indicated in FIG. 3F, in synchronism with the operation of receiving a supply of compressed air. The compressed air is thus supplied into the parison by the blowhead Ia, whereupon the parison is blow-molded as indicated in FIG. 3G. Accordingly, the parison is formed into a glass bulb of a shape and size determined by the mold 25. Furthermore, when blowhead Ia arrives at a position below the bottom plate of the cooling air-storage vessel 14, the contact member 18 is raised along the step part 15a and the fitting part 22 is separated from the opening edge of the blow-molded glass bulb. Thus, a large quantity of air supplied from the cooling air-storage vessel 14 is supplied into the glass bulb to thereby cool the glass bulb.

Then, when the guide roller 23 of blowhead Ia contacts the cam member 10 mounted on the other (downstream) end of the track 7, sliding contact member 18 integrally mounted on tubular stem 17 separates from the bottom plate 15. When the guide roller 23 then moves past and off the inclined surface of cam member 10, the blowhead Ia is turned upward around the sprocket 5 and, traveling along the track 8, returns to its initial state. The above described operations of parison-blowing, puffing-blowing, and forced-cooling are then repeated.

As described above, the apparatus according to the present invention is provided with a vacuum tank disposed adjacent to and in alignment with a first compressed air-storage vessel is that after a parison has been blown, the blown air is evacuated by a rapid lowering of the pressure within the parison below atmospheric pressure to thereby cause the parison neck part to contract to a dimension narrower than the opening of the mold. Accordingly, glass bulb structures having narrow neck portions can be readily produced without any possibility of the occurrence of deformation and projections such as casting fins at the neck portions due to biting of the neck portions of the parison with the mold.

What is claimed is:

1. In a glass bulb blow-molding apparatus having a platelike device including orifice plates having means therein defining orifices for conveying semimolten glass in ribbon form, a blowhead device including blowheads mounted for movement along a path of travel over the glass ribbon for blow-molding said glass, a mold-link device including molds and operating in synchronism with said blowhead device, and a first compressed air-storage vessel for supplying compressed air for blow-molding, the combination with said orifice plates, blowheads, molds, and compressed air-storage vessel of a second compressed air storage vessel and a vacuum tank interposed between said first and second compressed air storage vessels, said vessels and tank being consecutively aligned in a row along said path of travel with said second vessel disposed upstream from said tank, said second vessel supplying compressed air for initially blowing parisons from said glass through respective orifice-plate orifices, said vacuum tank being position to evacuate each parison to effect contraction of the neck portion thereof for unobstructed entrance into a mold, and said first vessel being positioned downstream from said vacuum tank to supply compressed air for final blow-molding of a glass bulb from each parison in the molds.

* * * * *